US012776496B2

(12) United States Patent
Braaten et al.

(10) Patent No.: US 12,776,496 B2
(45) Date of Patent: *Oct. 27, 2026

(54) ELECTROCHEMICAL CELL WITH BILAYER ELECTROCATALYST STRUCTURE INCLUDING GRAPHENE-BASED MATERIAL

(71) Applicant: Robert Bosch GmbH, Stuttgart (DE)

(72) Inventors: Jonathan Braaten, Sunnyvale, CA (US); Lei Cheng, Sunnyvale, CA (US); Shirin Mehrazi, Sunnyvale, CA (US); Morteza Rezaei Talarposhti, Sunnyvale, CA (US); Daniil Kitchaev, Brookline, MA (US); Nathan Craig, Sunnyvale, CA (US); Christina Johnston, Spanish Fort, AL (US)

(73) Assignee: Robert Bosch GmbH, Stuttgart (DE)

( * ) Notice: Subject to any disclaimer, the term of this patent is extended or adjusted under 35 U.S.C. 154(b) by 954 days.

This patent is subject to a terminal disclaimer.

(21) Appl. No.: 17/842,258

(22) Filed: Jun. 16, 2022

(65) Prior Publication Data

US 2023/0411631 A1 Dec. 21, 2023

(51) Int. Cl.
*H01M 4/86* (2006.01)
*H01M 8/1004* (2016.01)

(52) U.S. Cl.
CPC ....... *H01M 4/8668* (2013.01); *H01M 8/1004* (2013.01)

(58) Field of Classification Search
CPC ... H01M 4/8668; H01M 8/1004; C25B 13/05; C25B 9/23; C25B 1/04; C25B 13/08
See application file for complete search history.

(56) References Cited

U.S. PATENT DOCUMENTS 8,741,503 B2 6/2014 Akita
9,997,794 B2 6/2018 Burlatsky et al.
2011/0020727 A1 1/2011 Burlatsky et al.
(Continued)

FOREIGN PATENT DOCUMENTS

CN 103840174 A * 6/2014
JP 2007242423 A 9/2007
WO 2014009721 A1 1/2014

OTHER PUBLICATIONS

Atrazhev, V. V. et al., "The potential of catalytic particle in ion exchange membrane," Journal of Electroanalytical Chemistry, vol. 601, No. 1-2, 2007, pp. 251-259, DOI: 10.1016/j.jelechem.2006.11.010.

(Continued)

*Primary Examiner* — Basia A Ridley
*Assistant Examiner* — Heng M. Chan
(74) *Attorney, Agent, or Firm* — Brooks Kushman P.C.

(57) ABSTRACT

An electrochemical cell (e.g., a fuel cell) including an anode catalyst layer, a cathode catalyst layer, and an electrolyte membrane layer extending between the anode catalyst layer the cathode catalyst layer, and a graphene-based layer. The graphene-based layer is disposed between the cathode catalyst layer and the electrolyte membrane layer and/or the anode catalyst layer and the electrolyte membrane layer. The graphene-based layer is configured to suppress crossover gases and metallic cation exchange to enhance performance and durability of the electrochemical cell.

20 Claims, 3 Drawing Sheets

(56) References Cited

U.S. PATENT DOCUMENTS

| | | | | |
|---|---|---|---|---|
| 2011/0256468 | A1 | 10/2011 | Suzuki et al. | |
| 2015/0180073 | A1* | 6/2015 | Frost | H01M 8/1055 429/492 |
| 2017/0141406 | A1 | 5/2017 | Young et al. | |
| 2020/0099061 | A1 | 3/2020 | Price et al. | |
| 2021/0159528 | A1* | 5/2021 | Kim | H01M 4/8825 |
| 2021/0384540 | A1* | 12/2021 | Mistry | H01M 4/92 |
| 2022/0259748 | A1 | 8/2022 | Lee et al. | |
| 2023/0369612 | A1 | 11/2023 | Azra et al. | |
| 2023/0411631 | A1 | 12/2023 | Braaten et al. | |

OTHER PUBLICATIONS

Gubler, L. et al., "Polymer Design Strategies for Radiation-Grafted Fuel Cell Membranes," Advanced Energy Materials, vol. 4, No. 1300827, 2014, pp. 1-30, DOI: 10.1002/aenm.201300827.

Moghadam, F. et al., "Two-dimensional materials: an emerging platform for gas separation membranes," Current Opinion in Chemical Engineering, vol. 20, Feb. 19, 2018, pp. 28-38, DOI: 10.1016/j.coche.2018.02.004.

Stahler, A. et al., "Scalable Implementation of Recombination Catalyst Layers to Mitigate Gas Crossover in PEM Water Electrolyzers," Journal of The Electrochemical Society, vol. 169, No. 034522, Mar. 21, 2022, 10 pages, DOI: 10.1149/1945-7111/ac5c9b.

Extended European Search Report for European Application No. 24163159.7, mailed Mar. 17, 2025, 45 pages.

Kim, T. et al., "Monolayer Hexagonal Boron Nitride Nanosheets as Proton-Conductive Gas Barriers for Polymer Electrolyte Membrane Water Electrolysis," ACS Applied Nano Materials, vol. 4, No. 9, Sep. 24, 2021, pp. 9104-9112, DOI: 10.1021/acsanm.1c01691.

* cited by examiner

ELECTROCHEMICAL CELL WITH BILAYER ELECTROCATALYST STRUCTURE INCLUDING GRAPHENE-BASED MATERIAL

TECHNICAL FIELD

The present disclosure relates to an electrochemical cell with a bilayer electrocatalyst structure including a graphene-based material.

BACKGROUND

An electrochemical cell is a device capable of either generating electrical energy from chemical reactions (e.g., fuel cells) or using electrical energy to conduct chemical reactions (e.g., electrolyzers). Fuel cells have shown promise as an alternative power source for vehicles and other transportation applications. Fuel cells operate with a renewable energy carrier, such as hydrogen. Fuel cells also operate without toxic emissions or greenhouse gases. An individual fuel cell includes a membrane electrode assembly (MEA) and two flow field plates. An individual fuel cell typically delivers 0.3 to 1.0 V. Individual fuel cells can be stacked together to form a fuel cell stack having higher voltage and power.

Electrolyzers undergo an electrolysis process to split water into hydrogen and oxygen, providing a promising method for hydrogen generation from renewable resources. An electrolyzer, like a fuel cell, includes an anode and cathode catalyst layers separated by an electrolyte membrane. The electrolyte membrane may be a polymer, an alkaline solution, or a solid ceramic material. A catalyst material is included in the anode and cathode catalyst layers of the electrolyzer.

One of the current limitations of widespread adoption and use of this clean and sustainable technology is the relatively expensive cost of the fuel cell. A catalyst material (e.g., platinum catalyst) is included in both the anode and cathode catalyst layers of an electrochemical cell. The catalyst material is one of the most expensive components in the electrochemical cell.

SUMMARY

According to one embodiment, an electrochemical cell (e.g., a fuel cell) is disclosed. The electrochemical cell includes an anode catalyst layer, a cathode catalyst layer, an electrolyte membrane layer extending between the anode catalyst layer and the cathode catalyst layer, and a graphene-based layer. The graphene-based layer is disposed between the cathode catalyst layer and the electrolyte membrane layer and/or the anode catalyst layer and the electrolyte membrane layer. The graphene-based layer may be separate and discrete from the anode catalyst layer, the cathode catalyst layer, and the electrolyte membrane layer. The graphene-based layer may include first regions of single layer graphene flakes and second regions of stacks of multi-layer graphene flakes. The graphene-based layer is configured to suppress crossover gases to enhance performance of the electrochemical cell and to block contaminant cations and oxygen crossover.

DETAILED DESCRIPTION

Figure 1:
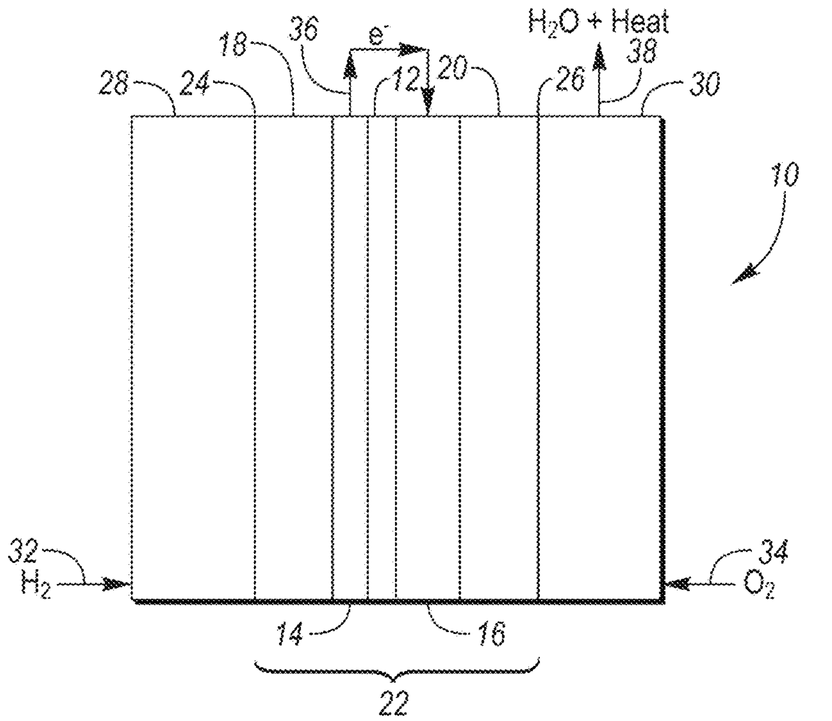
FIG. 1 depicts a schematic, side view of a fuel cell.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word “about” in describing the broadest scope of the invention. Practice within the numerical limits stated is generally preferred. Also, unless expressly stated to the contrary: percent, “parts of,” and ratio values are by weight; the term “polymer” includes “oligomer,” “ionomer,” “copolymer,” “terpolymer,” and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Proton-exchange membrane fuel cell (PEMFC) technology has been commercialized for fuel cell vehicle applications. FIG. 1 depicts a schematic, side view of fuel cell 10. Fuel cell 10 can be stacked to create a fuel cell stack. Fuel cell 10 includes polymer electrolyte membrane (PEM) 12, anode 14, cathode 16 and first and second gas diffusion layers (GDLs) 18 and 20. PEM 12 is situated between anode 14 and cathode 16. Anode 14 is situated between first GDL 18 and PEM 12 and cathode 16 is situated between second GDL 20 and PEM 12. PEM 12, anode 14, cathode 16 and first and second GDLs 18 and 20 comprise membrane electrode assembly (MEA) 22. First and second sides 24 and 26 of MEA 22 is bounded by flow fields 28 and 30, respectively. Flow field 28 supplies $H_2$ to MEA 22, as signified by arrow 32. Flow field 30 supplies $O_2$ to MEA 22, as signified by arrow 34. A catalyst material, such as platinum, is used in anode 14 and cathode 16. The catalyst material is commonly the most expensive constituent of MEA 22. Non-limiting examples of catalysts are noble metals such as platinum (Pt), palladium (Pd), or Iridium (Ir), and alloys thereof (e.g., Pt alloys), or their combination, as well as non-noble catalysts like doped carbons.

The anode performs the hydrogen oxidation reaction (HOR) (1) while the cathode performs the oxygen reduction reaction (ORR) (2):

$$H_2 \rightarrow 2H^+ + 2e^{-s} \quad (1)$$

$$4H^+ + O_2 + 4e^- \rightarrow 2H_2O \quad (2)$$

Generally, the $H_2$ is broken down on the surface of the electrocatalyst in the anode to form protons and electrons in a HOR. The electrons are transported through the support of the anode catalyst layer to the external circuit while the protons are pulled through the proton exchange membrane to the cathode catalyst layer. Once in the cathode catalyst layer, the protons move through the ion-conducting polymer or ionomer thin-film network to the electrocatalyst surface, where they combine with the electrons from the external circuit and the $O_2$ that has diffused through the pores of the cathode catalyst layer to form water in the ORR.

Electrolyzers present another type of electrochemical cell. Electrolyzers use electrical energy to conduct chemical reactions. Electrolyzers undergo an electrolysis process to split water into hydrogen and oxygen, providing a promising method for hydrogen generation from renewable resources. An electrolyzer, like a fuel cell, includes an anode and cathode catalyst layers separated by an electrolyte membrane. The electrolyte membrane may be a polymer, an alkaline solution, or a solid ceramic material. A catalyst material is included in the anode and cathode of the electrolyzer. Electrolyzers may be utilized in applications including industrial, residential, and military applications and technologies focus on energy storage such as electrical grid stabilization from dynamic electrical sources including turbines, solar cells, or localized hydrogen production.

A typical single electrolyzer is composed of an electrolyte membrane, an anode layer, and a cathode layer separated from the anode layer by the electrolyte membrane. An electrolyzer stack includes individual electrolyzer cells, each of which includes a membrane, electrodes, and bipolar plates. A catalyst material, such as Pt-based catalysts, is included in the anode and cathode layers of the electrolyzer stack. At the anode layers, $H_2O$ is hydrolyzed to $O_2$ and $H^+$ ($2H_2O \rightarrow O_2 + 4H^+ + 4e^-$). At the cathode layers 36, $H^+$ combines with electrons to form $H_2$ ($4H^+ + 4e^- \rightarrow 2H_2$).

During electrolysis, water is broken down into oxygen and hydrogen in anodic and cathodic electrically driven evolution reactions. Each electrode includes a porous transportation layer (PTL) and a catalyst layer. The reactant liquid water ($H_2O$) permeates through the anode PTL to the anode catalyst layer, where the oxygen evolution reaction (OER) occurs. The protons ($H^+$) travel via the membrane, and electrons (e-) conduct through an external circuit during the hydrogen evolution reaction (HER) at the cathode 36 catalyst layer. The anodic OER requires a much higher overpotential than the cathodic HER. It is the anodic OER which determines efficiency of the water splitting due to the sluggish nature of its four-electron transfer.

Electrocatalysts play a crucial role in the electrochemical cells as they enable the HOR, HER, ORR, and OER reactions. Electrocatalysts are typically included in a form of particles. To increase their stability and prevent their loss via dissolution or detachment, the catalysts may be attached to a support. The most frequently used catalysts are noble metals such as platinum (Pt), palladium (Pd), or Iridium (Ir), or their combination, as well as non-noble catalysts like doped carbons. The support may typically include carbon, metals, metal oxides, or their combination.

Electrocatalyst durability in electrochemical processes is a topic of great interest to guarantee stable performance of the electrochemical cells and devices. For example, stability of Pt nanoparticles (NPs) in fuel cells is a major technological challenge for fuel cell commercialization. Pt dissolution is typically observed when fuel cell operation is cycled into oxide formation voltage (e.g, greater than 0.9 Volts).

Carbon-supported platinum is currently the most widely used electrocatalysts in fuel cells and is a major contributor to fuel cost. Despite its maturity and improved performance, lifetime, and stability of fuels are greatly limited by the catalyst corrosion and degradation processes occurring on the surface of the catalyst, resulting in mass loss, structural evolution, and/or reduction in catalytically electrochemical active surface area (ECSA) (e.g., a formation of an electrically disconnected Pt band as described above).

Two key inhibitors to mass-market penetration of proton-exchange membrane fuel cell (PEMFC) vehicles are their high cost due to the platinum used as the catalyst and the degradation of the expensive platinum during voltage cycling. Platinum catalyst degrades during voltage cycling of PEMFCs, causing particle coarsening and deposition in the membrane as an electrically isolated platinum band that can no longer participate in the oxygen reduction reaction (ORR). This loss of active platinum is responsible for hindering efficiency and high-power performance in PEMFC vehicles and is a limitation on PEMFC vehicle lifetime.

In addition to the re-distribution of Pt, gas crossover through the membrane ($H_2$ from the anode, and $O_2$ from the cathode) lowers the reversible potential of the cell and contributes to degradation. $H_2$ crossover from the anode reacts with ionic Pt in the membrane to form the metallic Pt band. $O_2$ crossover from the cathode reacts in the anode to form peroxides, which then attack the ionomer in the catalyst layer and membrane. Both crossover mechanisms are responsible for additional degradation and are targets for improving performance and lifetime.

Graphene, graphene oxide, and functionalized versions thereof are materials capable of suppressing diffusion of large cations like Pt' and gaseous species, i.e., $O_2$ and $H_2$, and being highly permeable to protons. These qualities make graphene-based functional layers well-suited for functional layers designed to prevent Pt' and other cation redistribution and prevent/mitigate reactant gas crossover, while maintaining proton conductivity for PEMFC performance.

One or more embodiments disclose a graphene-based (e.g., functional graphene or graphene oxide) functional layer and its fabrication and integration within MEAS. In one embodiment, the graphene-based functional layer includes layers of graphene-based material. The graphene-based material may be a graphene material, a graphene oxide material, or a combination thereof. The graphene-base material layers may include individual layers of flakes bound together by an ionomer material.

In one or more embodiments, a selectively permeable graphene-based functional layer is utilized to improve the efficiency and durability of proton exchange membrane fuel cells. The functional layer(s) (as described herein) in a PEMFC MEA is configured to suppress the crossover of molecular oxygen and hydrogen for the purpose of enhancing efficiency and preventing degradation from species generated from these crossover gases. In addition, the functional layer(s) are configured to suppress the migration and/or diffusion of degraded cationic species like platinum from the catalyst and alloying elements cobalt and nickel from the de-alloyed interior of the catalyst particles. The functional layer may be configured to enhance both the durability of the MEA as well as improve efficiency and contribute to longer-lasting, higher-performing PEMFC MEAs.

Figure 2A:
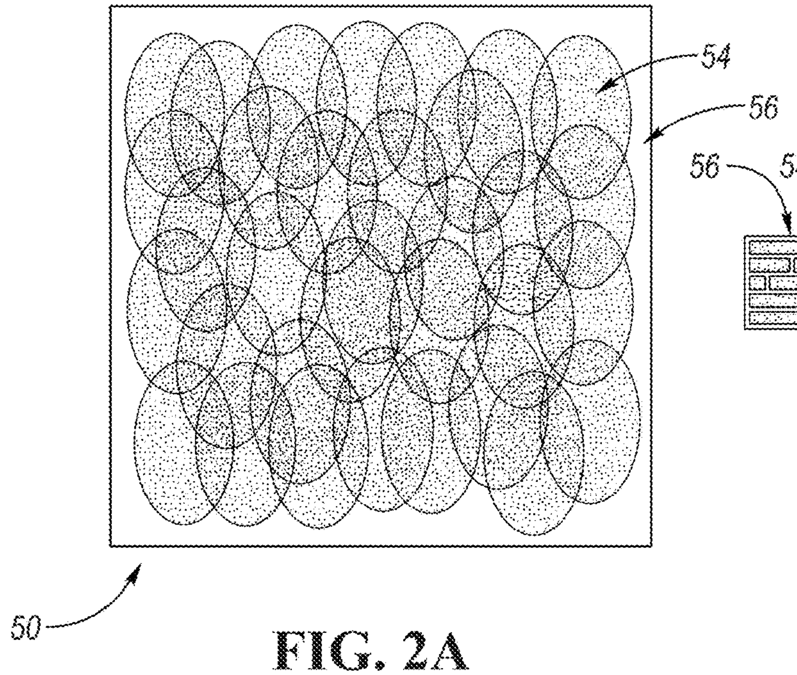
FIG. 2A depicts a top view of a graphene-based layer including graphene-based sublayers according to one embodiment.
Figure 2B:
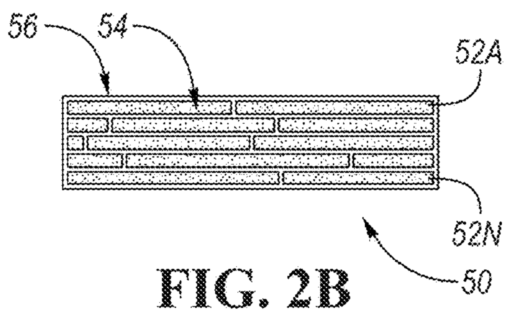
FIG. 2B depicts a side view of a graphene-based layer including graphene-based sublayers according to one embodiment.

FIG. 2A depicts a top view of graphene-based layer 50 including graphene-based sublayers. FIG. 2B depicts a side view of graphene-based layer 50 including graphene-based sublayers 52A through 52N. Each of the graphene-based sublayers is comprised of graphene-based flakes 54 bound together with polymeric binder 56. Polymeric binder 56 may be an ionomer material. Non-limiting examples of ionomer materials include a Nafion ionomer, a Nafion-based material, a polyfluoropolymer such as polytetrafluoroehtylene (PTFE), a low equivalent weight ionomer, a high oxygen permeable ionomer (HOPI), and a combination thereof. The graphene-based material may be a graphene material, a graphene oxide material, or a combination thereof. The weight ratio of the ionomer material to the graphene-based material in the graphene-based layer may be any of the following values or in the range of any two of the following values: 1:10, 2:10, 3:10, 4:10, 5:10, 6:10, 7:10, 8:10, 9:10, 1:1, 1.5:1, 2:1, 2.5:1, 3:1, 3.5:1, 4:1, 4.5:1, 5:1, 6:1, 7:1, 8:1, 9:1, and 10:1.

The graphene-based layer may be a discrete layer from a catalyst layer (e.g., a cathode catalyst layer) and/or membrane layer. The thickness of the graphene-based layer may be 0.1, 0.2, 0.3, 0.4, 0.5, 0.6, 0.7, 0.8, 0.9, 1.0, 1.5, 2.0, 2.5, 3.0, 3.5, 4.0, 4.5, and 5.0 μm. Alternatively, the graphene-based layer may be mixed with a catalyst layer (e.g., a cathode catalyst layer) and/or membrane layer.

Figure 3A:
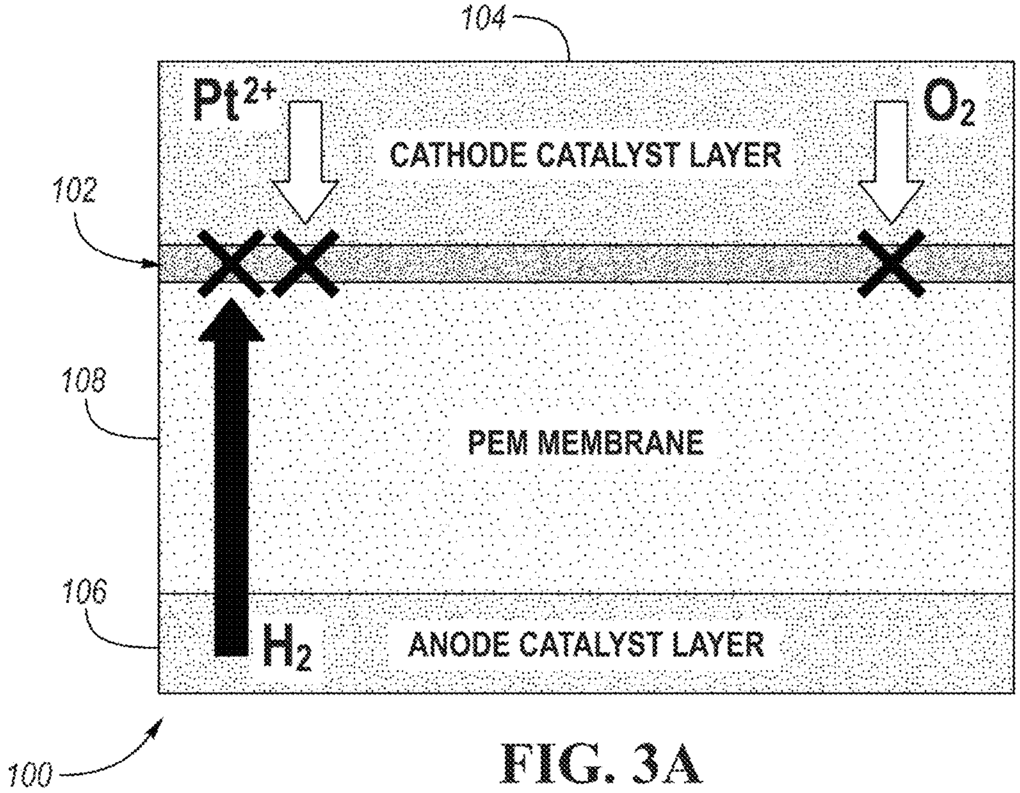
FIG. 3A depicts a schematic, side view of an MEA having a graphene-based layer at an interface between a cathode catalyst layer and an electrolyte membrane layer.

In one embodiment, the graphene-based layer may be disposed at the interface between a cathode catalyst layer and an electrolyte membrane layer. FIG. 3A depicts a schematic, side view of MEA 100 having graphene-based layer 102 according to one embodiment. MEA 100 includes cathode catalyst layer 104, anode catalyst layer 106, and electrolyte membrane layer 108 extending between cathode catalyst layer 104 and anode catalyst layer 106. Graphene-based layer 102 is disposed at the interface of cathode catalyst layer 104 and electrolyte membrane layer 108. Graphene-based layer 102 may be graphene-based sublayers where the sublayers are formed of graphene-based flakes bound by an ionomer material.

Graphene-based layer 102 is configured to reduce or prevent transport of molecular hydrogen into cathode catalyst layer 104 and molecular oxygen out of cathode catalyst layer 104. Graphene-based layer 102 is also configured to reduce or prevent transport of catalyst material (e.g., $Pt^{2+}$ catalyst material as shown in FIG. 3A) out of cathode catalyst layer 104. Graphene-based layer 102 is configured to suppress crossover gases (e.g., hydrogen into cathode catalyst layer 104 and molecular oxygen out of cathode catalyst layer 104). This suppression of crossover gases may improve performance and efficiency of the MEA. Moreover, the suppression may decrease degradation of the MEA by hindering degradation reactants (e.g., $O_2$ to the anode for peroxide formation and/or $H_2$ to the cathode for reducing cationic Pt).

Figure 3B:
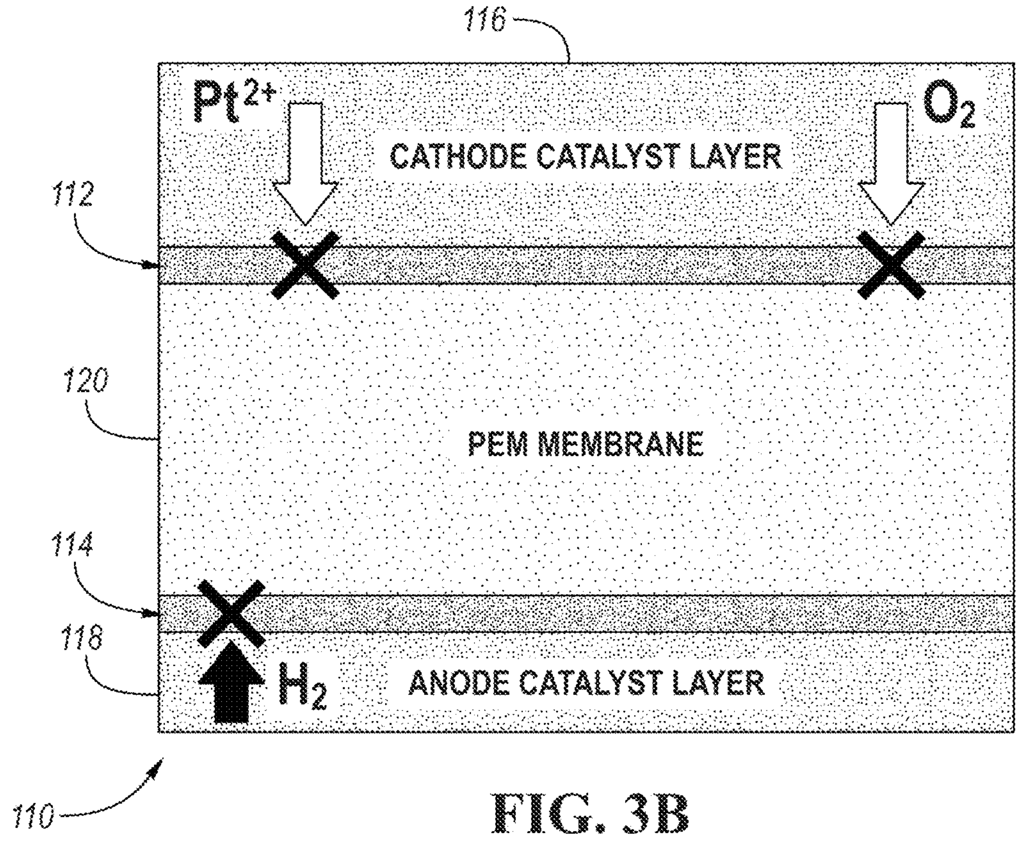
FIG. 3B depicts a schematic, side view of an MEA having first and second graphene-based layers at an interface between a cathode catalyst layer and an electrolyte membrane layer and an interface between an anode catalyst layer and an electrolyte membrane layer.

In another embodiment, the graphene-based layer may be disposed at the interface between a cathode catalyst layer and an electrolyte membrane layer and an anode catalyst layer and the electrolyte membrane layer. FIG. 3B depicts a schematic, side view of MEA 110 having graphene-based layers 112 and 114 according to one embodiment. MEA 110 includes cathode catalyst layer 116, anode catalyst layer 118, and electrolyte membrane layer 120 extending between cathode catalyst layer 116 and anode catalyst layer 118. Graphene-based layer 112 is disposed at the interface of cathode catalyst layer 116 and electrolyte membrane layer 120. Graphene-based layer 114 is disposed at the interface of anode catalyst layer 118 and electrolyte membrane layer 120. Graphene-based layers 112 and 114 may each be graphene-based sublayers where the sublayers are formed of graphene-based flakes bound by an ionomer material.

Graphene-based layers 112 and 114 are configured to reduce or prevent transport of molecular hydrogen into cathode catalyst layer 116 and molecular oxygen out of cathode catalyst layer 116. Graphene-based layers 112 and 114 are also configured to reduce or prevent transport of catalyst material (e.g., $Pt^{2+}$ catalyst material as shown in FIG. 3B) out of cathode catalyst layer 116. Graphene-based layers 112 and 114 are configured to suppress crossover gases (e.g., hydrogen into cathode catalyst layer 116 and molecular oxygen out of cathode catalyst layer 116). This suppression of crossover gases may improve performance and efficiency of the MEA. Moreover, the suppression may decrease degradation of the MEA by hindering degradation reactants (e.g., $O_2$ to the anode for peroxide formation and/or $H_2$ to the cathode for reducing cationic Pt).

Following is an experimental setup based on graphene-based functional layers fabricated based on one or more embodiments. A sample was prepared by dispersing Pt/C (40% Pt/C cathode and 30% Pt/C anode) and Nafion dispersion (D2020, available from Ion Power Inc.) in a water-isopropyl alcohol (IPA) solvent (W to IPA equals 1), using a planetary ball milling mixer (Thinky mixer available from Thinky U.S.A., Inc.). The Pt loading of the resulting catalyst layer was and 0.2 $mg_{Pt}/cm^2$ in the cathode and anode, respectively. The ionomer to carbon ratio was set at in both the anode and cathode inks. The catalyst ink was coated on a virgin PTFE substrate using Mayer Rod #40 and transferred to a Nafion XL membrane (available from Ion Power Inc.) via decal transfer method at 135° C. and 300 Psi.

A sample with a graphene-oxide blocking layer was prepared by overcoating the baseline cathode catalyst decal with a water-based graphene oxide-Nafion dispersion. (Ionomer/graphene oxide equals 0.9). The graphene oxide concentration was 4 mg/ml of solvent. The cathode catalyst double layer was then transferred to the membrane under the same condition as the baseline sample. The overall thickness of the double layer was 10 μm (i.e., 8 μm catalyst layer and a 2 μm graphene oxide layer). The MEA with 4 cm 2 active area was assembled with AVCarb gas diffusion media (available from AvCarb Material Solutions) for hydrogen cross over measurements. Linear sweep voltammetry was measured with $H_2$ (0.2 NL/min) flowing on the anode side and $N_2$ (0.8 NL/min) on the cathode side under 100% RH, atmospheric pressure, and at 80° C.

Figure 4:
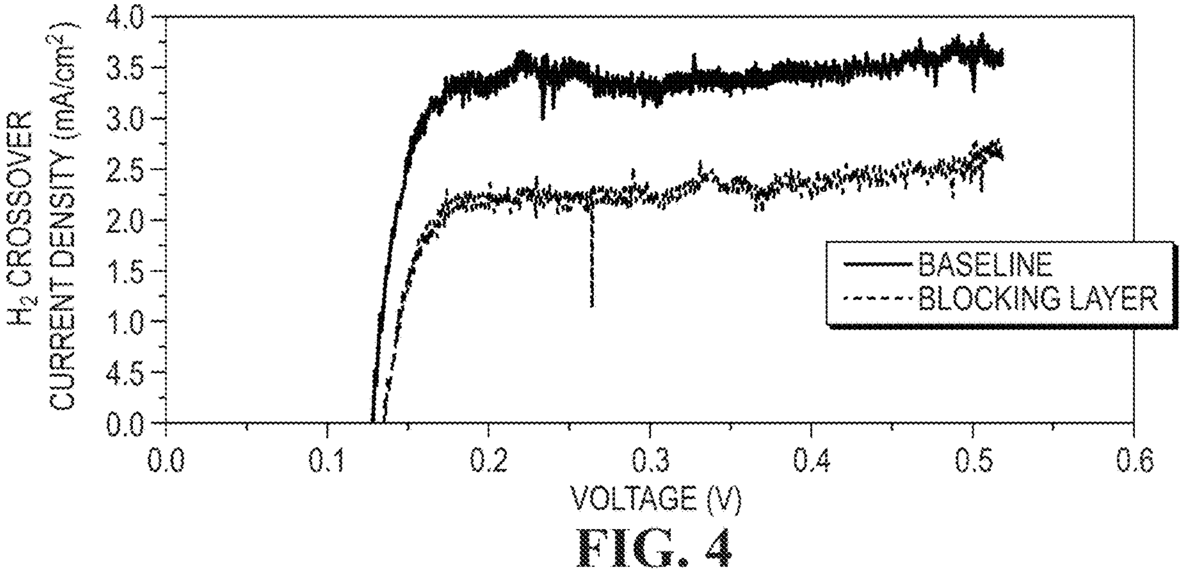
FIG. 4 is a graph plotting hydrogen crossover current density (mA/cm$^2$) as a function of voltage (V).

Following are the experimental results using the two samples prepared above. The fabrication of a graphene oxide-enhanced membrane electrode assembly, where the graphene oxide layer was deposited between a Nafion XL membrane and the cathode catalyst layer of a PEMFC MEA in a hydrogen crossover measurement, resulted in a lower measured crossover current density. FIG. 4 is a graph plotting hydrogen crossover current density (mA/cm 2) as a function of voltage (V) between a baseline MEA using a Nafion XL membrane versus the graphene oxide enhanced MEA using the same Nafion XL membrane with a blocking graphene oxide layer. FIG. 4 supports how a graphene oxide functional layer reduces crossover current density. This reduced crossover is indicative of a hindered $H_2$ flux from the anode of the PEMFC to the cathode, where pure $N_2$ exists in the measurement.

Figure 5:
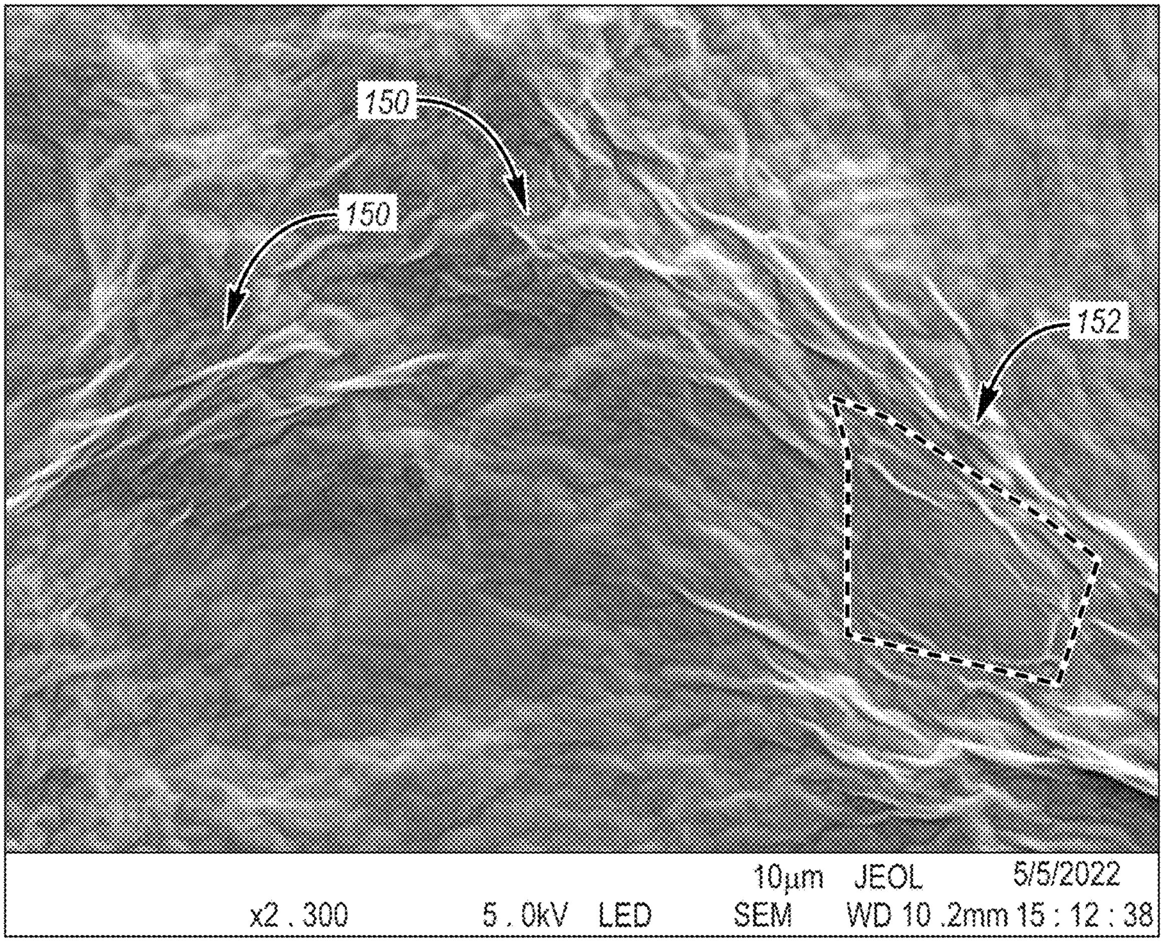
FIG. 5 depicts a top-down scanning electron microscope (SEM) image showing graphene oxide stacks versus a single layer graphene oxide.

FIG. 5 depicts a top-down scanning electron microscope (SEM) image showing graphene oxide stacks 150 versus single layer graphene oxide 152. It can be seen from FIG. 5 that the Nafion-rich graphene oxide layer covers the catalyst surface with both single layers and stacked layers.

In one or more embodiments, an electrochemical cell including a membrane electrode assembly (MEA) is disclosed. The MEA includes an anode catalyst layer, a cathode catalyst layer, and an electrolyte membrane layer extending between the anode catalyst layer and the cathode catalyst layer. A graphene-based layer may be disposed between the cathode catalyst layer and the electrolyte membrane layer and/or the anode catalyst layer and the electrolyte membrane layer. The graphene-based layer may be separate and discrete from the anode catalyst layer, the cathode catalyst layer, and the electrolyte membrane layer such that the contents of the graphene-based layer does not commingle with the contents of the anode catalyst layer, the cathode catalyst layer, or the electrolyte layer upon fabrication of the MEA of the electrochemical cell. In other embodiments, there may be commingling between the contents of the graphene-based layer and the contents of the anode catalyst layer, the cathode catalyst layer, and/or the electrolyte layer upon fabrication of the MEA of the electrochemical cell.

The graphene-based layer may include sublayers of graphene-based flakes forming a stacked configuration of the sublayers. The sublayers may be bound by an ionomer material configured to maintain the stacked configuration of the sublayers. The graphene-based flakes may be oriented substantially parallel to each other in the stacked configuration to maximize the tortuosity of gas diffusion through the graphene-based layer.

The graphene-based layer may be manufactured via scalable roll-to-roll or spray-coating methods. These fabrication methods may be used to provide a separate and discrete graphene-based layer. The graphene-based layer is configured to suppress molecular hydrogen and oxygen crossover. The graphene-based layer is configured to maintain proton conductivity on an order of Nafion. The graphene-based layer is configured to suppress diffusion of cationic metal species (e.g., $Pt^{2+}$, $Co^{2+}$, and $Ni^{2+}$).

The following application is related to the present application: U.S. patent application Ser. No. 17/842,029, filed on Jun. 16, 2022, and issued as U.S. Pat. No. 12,199,291 on Jan. 14, 2025, which is incorporated by reference in its entirety herein.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electrochemical cell comprising:

an anode catalyst layer;

a cathode catalyst layer;

an electrolyte membrane layer extending between the anode catalyst layer and the cathode catalyst layer; and a graphene-based layer disposed between the cathode catalyst layer and the electrolyte membrane layer and/or the anode catalyst layer and the electrolyte membrane layer, contents of the graphene-based layer are commingled with contents of the anode and/or cathode catalyst layers and the electrolyte membrane layer, the graphene-based layer includes sublayers of graphene-based flakes forming a stacked configuration of the sublayers of the graphene-based flakes, the graphene-based layer is configured to suppress crossover gases to enhance performance of the electrochemical cell.

2. The electrochemical cell of claim 1, wherein the graphene-based flakes in the graphene-based sublayers are substantially parallel to each other in the stacked configuration.

3. The electrochemical cell of claim 1, wherein the sublayers of the graphene-based flakes are bound by an ionomer material configured to maintain the stacked configuration of the sublayers of the graphene-based flakes.

4. The electrochemical cell of claim 3, wherein the ionomer material includes a Nafion ionomer, a Nafion-based material, a polyfluoropolymer, a low equivalent weight ionomer, a high oxygen permeable ionomer (HOPI), or a combination thereof.

5. The electrochemical cell of claim 1, wherein the graphene-based layer includes a graphene-based material and an ionomer material configured to bond the graphene-based material, a weight ratio of the ionomer material to the graphene-based material is 1:10 to 10:1.

6. The electrochemical cell of claim 1, wherein a thickness of the graphene-based layer is 0.1 to 5.0 μm.

7. The electrochemical cell of claim 1, wherein the graphene-based layer includes a graphene oxide material.

8. The electrochemical cell of claim 1, wherein the graphene-based layer includes a functionalized graphene-oxide material.

9. The electrochemical cell of claim 1, wherein the graphene-based layer is mixed with the anode and/or cathode catalyst layers and the electrolyte membrane layer.

10. An electrochemical cell comprising:

an anode catalyst layer;

a cathode catalyst layer;

an electrolyte membrane layer extending between the anode catalyst layer and the cathode catalyst layer; and a graphene-based layer disposed between the cathode catalyst layer and the electrolyte membrane layer and/or the anode catalyst layer and the electrolyte membrane layer, wherein contents of the graphene-based layer are commingled with contents of the anode and/or cathode catalyst layers and the electrolyte membrane layer, the graphene-based layer includes sublayers of graphene-based flakes forming a stacked configuration of the sublayers of the graphene-based flakes, a thickness of the graphene-based layer is 0.1 to 5.0 μm, and the graphene-based layer is configured to suppress crossover gases to enhance performance of the electrochemical cell.

11. The electrochemical cell of claim 10, wherein the sublayers of the graphene-based flakes are bound by an ionomer material configured to maintain the stacked configuration of the sublayers of the graphene-based flakes.

12. The electrochemical cell of claim 11, wherein the ionomer material includes a Nafion ionomer, a Nafion-based material, a polyfluoropolymer, a low equivalent weight ionomer, a high oxygen permeable ionomer (HOPI), or a combination thereof.

13. The electrochemical cell of claim 10, wherein the graphene-based layer includes a graphene oxide material.

14. The electrochemical cell of claim 10, wherein at least some of the graphene-based flakes of at least one of the sublayers overlap with each other.

15. The electrochemical cell of claim 14, wherein the graphene-based flakes in the graphene-based sublayers are substantially parallel to each other in the stacked configuration.

16. An electrochemical cell comprising:

an anode catalyst layer;

a cathode catalyst layer;

an electrolyte membrane layer extending between the anode catalyst layer and the cathode catalyst layer; and a graphene-based layer disposed between the cathode catalyst layer and the electrolyte membrane layer and/or the anode catalyst layer and the electrolyte membrane layer, the graphene-based layer includes first regions of single layer graphene flakes and second regions of stacks of multi-layer graphene flakes, the graphene-based layer includes a graphene-based material and an ionomer material configured to bind the graphene-based material, a weight ratio of the ionomer material to the graphene-based material is 0.5:1 to 5:1, the graphene-based layer is configured to suppress crossover gases to enhance performance of the electrochemical cell.

17. The electrochemical cell of claim 16, wherein the graphene flakes in the first and second regions are graphene oxide flakes.

18. The electrochemical cell of claim 16, wherein the graphene flakes are bound by the ionomer material configured to maintain the first regions of single layer graphene flakes and the second regions of stacks of multi-layer graphene flakes.

19. The electrochemical cell of claim 18, wherein the ionomer material includes a Nafion ionomer, a Nafion-based material, a polyfluoropolymer, a low equivalent weight ionomer, a high oxygen permeable ionomer (HOPI), or a combination thereof.

20. The electrochemical cell of claim 16, wherein the graphene-based layer is only disposed between the cathode catalyst layer and the electrolyte membrane layer.

* * * * *